United States Patent
Anjur

(10) Patent No.: US 7,818,305 B2
(45) Date of Patent: Oct. 19, 2010

(54) HIERARCHICAL TRIGGERS FOR DATABASE

(75) Inventor: Vijayakumar Anjur, Sunnyvale, CA (US)

(73) Assignee: Hyperion Solution Corporation, Redwood Shores, CA (US)

( * ) Notice: Subject to any disclaimer, the term of this patent is extended or adjusted under 35 U.S.C. 154(b) by 221 days.

(21) Appl. No.: 11/868,931

(22) Filed: Oct. 8, 2007

(65) Prior Publication Data

US 2008/0027896 A1 Jan. 31, 2008

Related U.S. Application Data

(63) Continuation of application No. 10/448,719, filed on May 29, 2003, now abandoned.

(51) Int. Cl.
*G06F 7/00* (2006.01)
*G06F 17/00* (2006.01)
(52) U.S. Cl. .................................... 707/702; 707/687
(58) Field of Classification Search ................ 707/1–5, 707/702, 687
See application file for complete search history.

(56) References Cited

U.S. PATENT DOCUMENTS

| | | | |
|---|---|---|---|
| 6,006,224 A * | 12/1999 | McComb et al. | 707/5 |
| 6,144,967 A * | 11/2000 | Nock | 707/103 R |
| 6,405,212 B1 * | 6/2002 | Samu et al. | 707/103 R |
| 6,594,656 B1 * | 7/2003 | Arlein et al. | 707/4 |
| 6,804,819 B1 * | 10/2004 | Bates et al. | 719/318 |

OTHER PUBLICATIONS

Feuerstein, Steven, "Oracle PL/SQL Developer's Workbook" May 2000, O'Reilly <http://oreilly.com/catalog/ordevworkbook/chapter/ch16s.html>, p. 1-9.*

* cited by examiner

*Primary Examiner*—Brent Stace
(74) *Attorney, Agent, or Firm*—Townsend and Townsend and Crew LLP

(57) ABSTRACT

The present invention introduces the concept of a super-trigger to allow for multi-level hierarchical triggers in a database application. The super-trigger may be created by identifying one or more triggers as sub-triggers, and defining a condition in the super-trigger, the result of the condition depending from a result of one or more of the sub-triggers. Upon execution, information may be retrieved regarding a result for each of the sub-triggers. The condition may then be evaluated using these results, and an action may be performed if the condition is met.

20 Claims, 4 Drawing Sheets

HIERARCHICAL TRIGGERS FOR DATABASE

CROSS REFERENCES TO RELATED APPLICATIONS

This application is a continuation of and claims priority to U.S. patent application Ser. No. 10/448,719, filed on May 29, 2003, now abandoned the contents of which are herby incorporated herein by reference for all purposes.

FIELD OF THE INVENTION

The present invention relates to the field of computer databases. More specifically, the present invention relates to hierarchical triggers for databases.

BACKGROUND OF THE INVENTION

Database applications are commonly used to store large amounts of data. One common application for such databases is business management. When used for business management, it is common for certain employees of a business to wish to be notified when certain events occur. In order to accomplish this, triggers may be set up such that if certain data in the database meets or violates certain conditions, alerts may be sent to the appropriate parties.

For example a department store may utilize a database to track inventory, sales, etc. In the men's department, there may be triggers to indicate when sweaters should be put on sale (based on, for example, high inventory, competitor pricing, or other market conditions). There may be many different types of triggers, for example one for sweaters, one for pants, etc.

Certain types of triggers need to be seen by certain employees. For example, a trigger involving sale prices or sales data may be directed towards a sales manager, whereas a trigger involving inventory levels may be directed towards an inventory manager.

One problem encountered with this approach is that there are often multiple parties that need to be made aware when certain trigger events occur. Most workplaces are divided into hierarchies, with the CEO or president at the top of the hierarchy, and rank-and-file workers at the bottom. In the middle are often several levels of managers. A number of salespeople may be managed by a sales manager who in turn may be managed by the vice president for sales and inventory. The vice president for sales and inventory may then also be managing an inventory manager.

It would be beneficial to have certain people in the hierarchy receive alerts that others are receiving as well. For example, it may be beneficial for a sales manager to see all alerts that the individual salespeople get. To that same extent, however, it may also be beneficial for such redundant alerts to be limited. In that, perhaps a manager or vice president may only wish to receive an alert regarding an underling if certain criteria are met (like a significant drop off in sales as opposed to a minor one, or a case where several different divisions report minor drop offs in sales as opposed to just one).

Currently, the only known mechanism to implement such triggers would be to utilize OR clauses in the triggers to cover all cases. An OR clause utilizes the boolean expression OR in between two variables. If either variable is true, then the OR clause is deemed to be true as well. OR clauses may be grouped together using other mathematical operators to form logical formulas. Applying OR clauses to a typical organization may involve linking 30 or 40 variables with OR clauses. This has several drawbacks. First, it is very cumbersome to write a trigger like this with so many OR clauses. Since the people setting up these triggers will often be high-level employees such as managers and vice presidents, they may not have the programming knowledge or free time to write so many OR clauses. Second, if any of the "lower-level" trigger's conditions change, someone needs to remember to go and update the "higher-level" trigger's condition. All of this results in a very inefficient solution.

What is needed is a more efficient solution to dealing with the need for triggers for more than one employee.

BRIEF DESCRIPTION

The present invention introduces the concept of a super-trigger to allow for multi-level hierarchical triggers in a database application. The super-trigger may be created by identifying one or more triggers as sub-triggers, and defining a condition in the super-trigger, the result of the condition depending from a result of one or more of the sub-triggers. Upon execution, information may be retrieved regarding a result for each of the sub-triggers. The condition may then be evaluated using these results, and an action may be performed if the condition is met.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
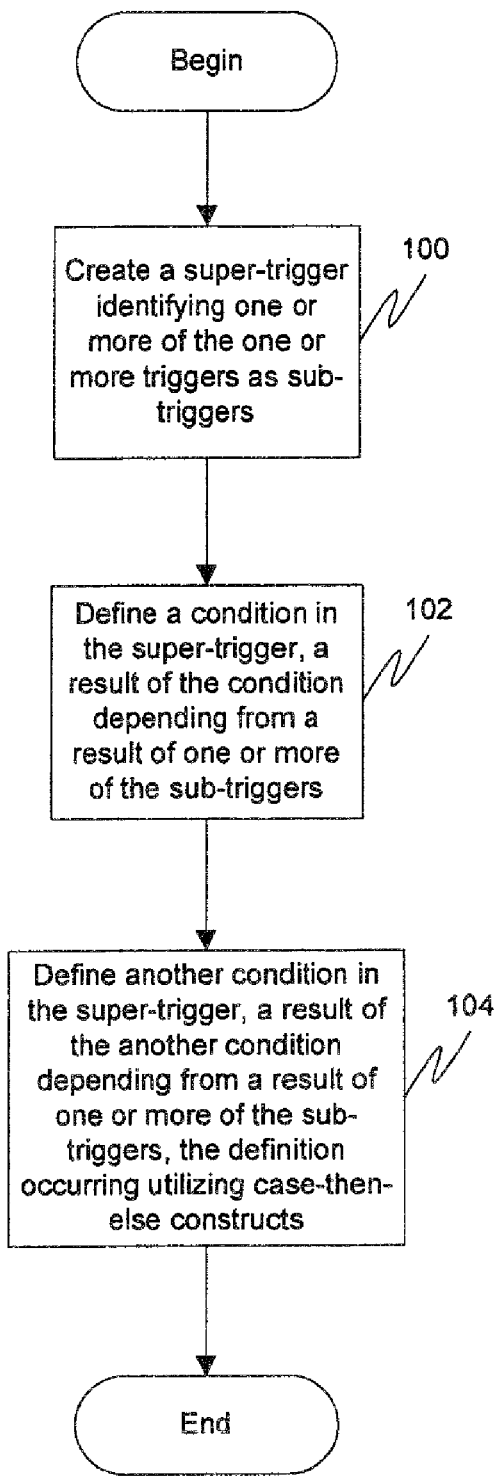
FIG. 1 is a flow diagram illustrating a method for organizing one or more triggers in a database application in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure, Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hard-wired devices, field programmable gate arrays (FPGAs), application specific integrated circuits (ASICs), or the like, may also be used without departing from the scope and spirit of the inventive concepts disclosed herein.

The present invention introduces the concept of a super-trigger to allow for multi-level hierarchical triggers in a database application. The super-trigger may be defined without using a significant number of OR clauses. The super-trigger may be easily created by a high-level employee, and may be executed dynamically so as to eliminate the need for updates to the super-trigger when lower-level triggers change. This helps to eliminate redundant alerts (at least unless they are desired), while maintaining a simple and easy to use interface.

In an embodiment of the present invention, the super-trigger may take advantage of the fact that it is typical for the results of evaluating triggers to be logged and saved in the system. Therefore, the super-trigger need not analyze whether individual sub-triggers have had their conditions met. It need only retrieve the results of the sub-trigger test from the log. This greatly improves execution time. One of ordinary skill in the art will recognize, however, that implementations are possible where a log file does not exist or an existing log file is not used.

A super-trigger may be defined as a trigger that has a result of another trigger as one of its conditions. For purposes of this document, a sub-trigger may be defined as a trigger whose result is a condition of another trigger. Therefore, it is possible for a single trigger to be both a super-trigger and a sub-trigger, if, for example, it lies in the middle of the hierarchical tree.

A super-trigger may have an additional feature as well. It may not have any region of its own. By this, it is meant that the conditions of the super-trigger may be made up only of conditions depending on the results of other triggers. This greatly simplifies its implementation.

In an embodiment of the present invention, additional syntax may be defined for a database programming language for use with the super-triggers, such as MaxL™, created by Hyperion Solutions Corp. of Sunnyvale, Calif. For example, the keyword "threshold" may mean the count of the number of triggers in a group that have been activated. This can be very useful in what is likely to be a very popular type of super-trigger, the firing of the super-trigger if a certain number of sub-triggers have been activated. This allows, for example, a vice president to be alerted if more than a certain number of his managers have been alerted to problems. If used in an embodiment where logging is utilized, this threshold value can be determined very quickly by examining the log file for the results of sub-triggers. There may also be more than one threshold by utilizing case-then-else constructs.

For example, if T1, T2, T3 are triggers, then a super-trigger T4 may be defined as such:
Create TriggerGroup T4 with (T1, T2, T3)
when threshold >1 then email Bob
when threshold >2 then email Job.

When the super-trigger is activated, an email may be sent or the violating intersections may be written to a file (or both). In an embodiment of the present invention, the constraint utilized may be any complex multidimensional expression. The region may be any combination of metadata functions to express a multidimensional region.

It should be noted that triggers can be set to go off more than once, so that the threshold value can be greater than the number of triggers. In the above example, for instance, the threshold value for emailing Bob may be 4 rather than 1. Even though there are only 3 triggers, if one of them is activated 3 times and the others once, then the threshold may be exceeded. Similarly, only one of them may trigger, but it may trigger 10 times. The threshold may be exceeded in this case as well. It should be noted that this is only one embodiment of the present invention, and embodiments may exist where the semantics are different, or where several different semantic types are intermixed.

FIG. 1 is a flow diagram illustrating a method for organizing one or more triggers in a database application in accordance with an embodiment of the present invention. At 100, a super-trigger may be created identifying one or more of the one or more triggers as sub-triggers. This may be accomplished using multidimensional expressions. One or more of the sub-triggers may be super-triggers themselves. At 102, a condition may be defined in the super-trigger, a result of the condition depending from a result of one or more of the sub-triggers. This may be accomplished using multidimensional expressions. The condition may be, for example, whether a threshold value has been exceeded. The threshold value may be defined using a key word defined in multidimensional expression syntax. At 104, another condition may be defined in the super-trigger, a result of the another condition depending from a result of one or more of the sub-triggers, the defining occurring utilizing case-then-else constructs.

Figure 2:
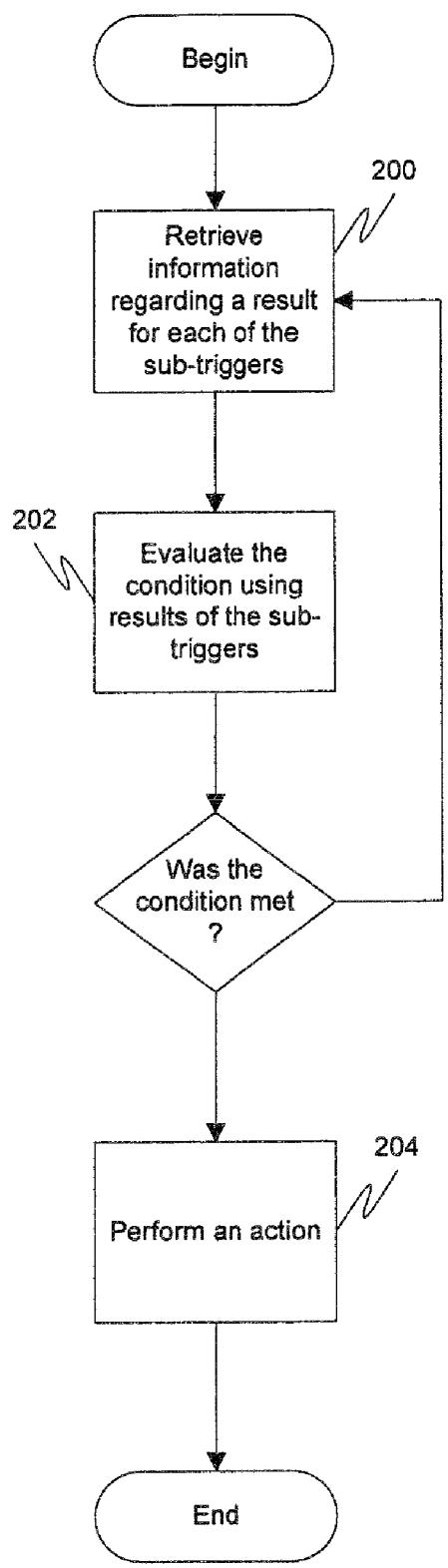
FIG. 2 is a flow diagram illustrating a method for executing a super-trigger, the super-trigger having one or more sub-triggers and a condition, the condition depending from one or more of the sub-triggers, in accordance with an embodiment of the present invention.

FIG. 2 is a flow diagram illustrating a method for executing a super-trigger, the super-trigger having one or more sub-triggers and a condition, the condition depending from one or more of the sub-triggers, in accordance with an embodiment of the present invention. The condition may be a multidimensional expression. At 200, information regarding a result for each of the sub-triggers may be retrieved. This retrieving may include retrieving information from a log. At 202, the condition may be evaluated using results of the sub-triggers. This evaluating may include evaluating a threshold value based on one or more of the sub-triggers against a fixed value. The threshold value may be a count of the number of firings of sub-triggers, and may be incremented each time a sub-trigger is activated, even if the sub-trigger has been activated before. It also may be a count of unique firings or subtriggers, depending on the semantics chosen. At 204, an action may be performed if the condition is met. This may include sending an email and/or writing data corresponding to any activated sub-trigger to a file. Redundant emails may be avoided because it is extremely easy to set up and cancel email alerts for any individual in the organization.

Figure 3:
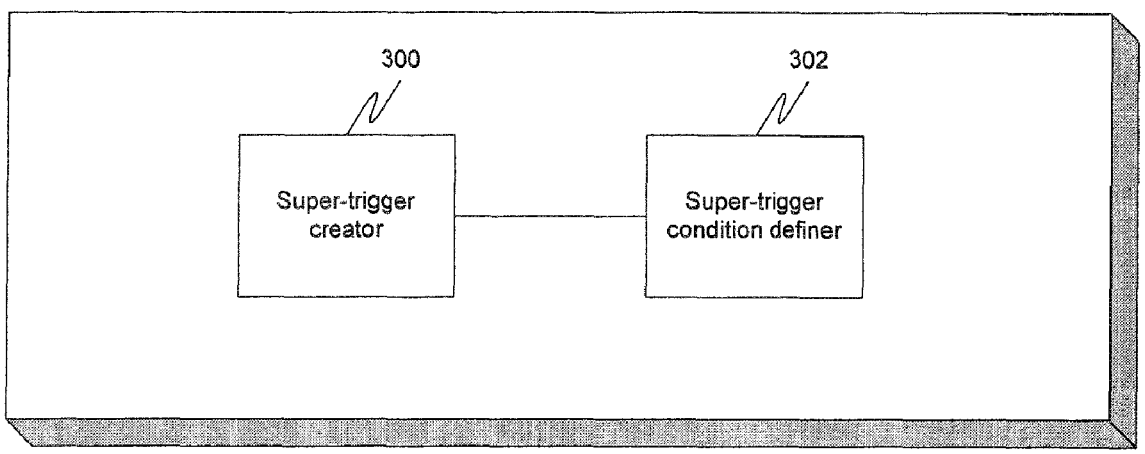
FIG. 3 is a block diagram illustrating an apparatus for organizing one or more triggers in a database application in accordance with an embodiment of the present invention.

FIG. 3 is a block diagram illustrating an apparatus for organizing one or more triggers in a database application in accordance with an embodiment of the present invention. A super-trigger creator 300 may create a super-trigger identifying one or more of the one or more triggers as sub-triggers. This may be accomplished using multidimensional expressions. One or more of the sub-triggers may be super-triggers themselves. A super-trigger condition definer 302 coupled to the super-trigger creator 300 may define a condition in the super-trigger, a result of the condition depending from a result of one or more of the sub-triggers. This may be accomplished using multidimensional expressions. The condition may be, for example, whether a threshold value has been exceeded. The threshold value may be defined using a key word defined in multidimensional expression syntax. Another condition may be defined in the super-trigger using the super-trigger condition definer, a result of the another condition depending from a result of one or more of the sub-triggers, the defining occurring utilizing case-then-else constructs.

Figure 4:
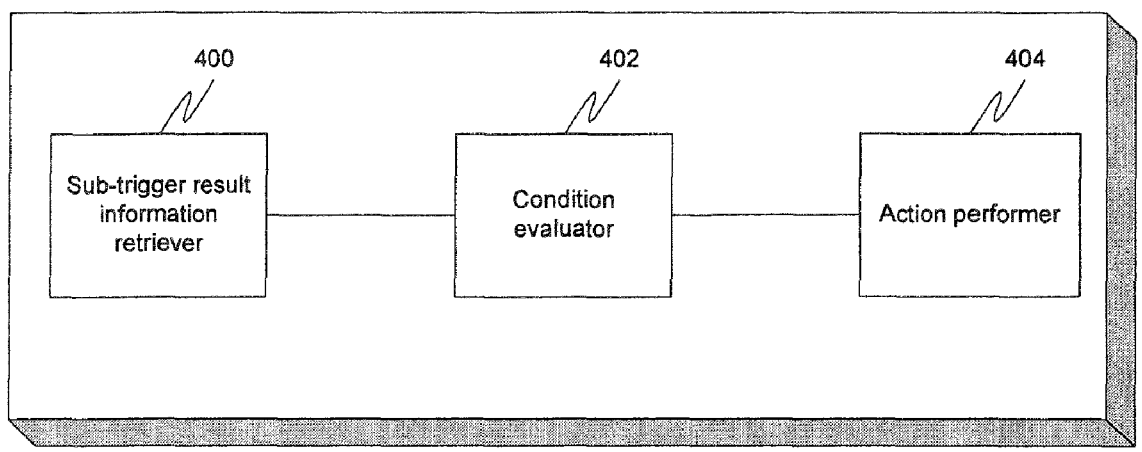
FIG. 4 is a block diagram illustrating an apparatus for executing a super-trigger, the super-trigger having one or more sub-triggers and a condition, the condition depending from one or more of the sub-triggers, in accordance with an embodiment of the present invention.

FIG. 4 is a block diagram illustrating an apparatus for executing a super-trigger, the super-trigger having one or more sub-triggers and a condition, the condition depending from one or more of the sub-triggers, in accordance with an embodiment of the present invention. The condition may be a multidimensional expression. A sub-trigger result information retriever 400 may retrieve information regarding a result for each of the sub-triggers. This retrieving may include retrieving information from a log. A condition evaluator 402 coupled to the sub-trigger result information retriever 400 may evaluate the condition using results of the sub-triggers. This evaluating may include evaluating a threshold value based on one or more of the sub-triggers against a fixed value. The threshold value may be a count of the number of firings of sub-triggers, and may be incremented each time a sub-trigger is activated, even if the sub-trigger has been activated before. It also may be a count of unique firings or subtriggers, depending on the semantics chosen. An action performer 404 coupled to the condition evaluator 402 may perform an action if the condition is met. This may include sending an email and/or writing data corresponding to any activated sub-trigger to a file.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for organizing triggers, the method comprising:
   creating a super-trigger in a database application executing on a server computer, by storing metadata that (a) establishes activation of one or more triggers as one or more sub-triggers of said super-trigger, (b) specifies a condition, and (c) specifies an action;
   when said super-trigger is activated, performing, on the server computer, the steps of:
      determining an activation count that indicates how many times said one or more sub-triggers of said super-trigger have been activated;
      based on said activation count exceeding a threshold values, determining whether said condition is satisfied; and
      in response to determining that said condition is satisfied, performing said action on the server computer;
      wherein said threshold value is defined using a key word defined in multidimensional expression syntax.

2. The method of claim 1 wherein said metadata establishes a plurality of triggers as sub-triggers of said super-trigger.

3. The method of claim 1, wherein:
   the super-trigger is a first super-trigger;
   the method further comprises:
      creating a second super-trigger by storing metadata that (a) establishes one or more triggers as one or more sub-triggers of said second super-trigger, (b) specifies a condition, and (c) specifies an action;
      when said second super-trigger is activated, performing the steps of:
         determining an activation count that indicates how many times said one or more sub-triggers of said second super-trigger have been activated;
         based on said activation count, determining whether said condition is satisfied; and
         in response to determining that said condition is satisfied, performing said action;
      the second super-trigger is a sub-trigger of the first super-trigger.

4. The method of claim 1, wherein:
   said condition is one of a plurality of conditions specified for said super-trigger in said metadata; and
   said plurality of conditions is defined using case-then-else constructs.

5. The method of claim 1, wherein determining an activation count includes retrieving information from a log.

6. The method of claim 1, wherein said determining whether said condition is satisfied includes evaluating a threshold value based on one or more of said one or more sub-triggers against a fixed value.

7. The method of claim 1, wherein performing said action includes sending an email.

8. The method of claim 1, wherein performing said action includes writing data corresponding to any activated sub-trigger to a file.

9. The method of claim 1, wherein the activation count is based, at least in part, on how many times a particular sub-trigger of said super-trigger was activated.

10. The method of claim 1, wherein:
    the metadata for said super-trigger specifies:
       a plurality of conditions, and
       a plurality of actions that correspond to the plurality of conditions;
    the step of determining whether said condition is satisfied, includes determining which condition of the plurality of conditions are satisfied; and performing said action includes performing the action that corresponds to the condition, of the plurality of conditions, that is satisfied.

11. A computer-readable storage medium storing instructions, the instructions including instructions which, when executed by one or more processors, cause the one or more processors to perform the steps of:
    creating a super-trigger by storing metadata that (a) establishes activation of one or more triggers as one or more sub-triggers of said super-trigger, (b) specifies a condition, and (c) specifies an action;
    when said super-trigger is activated, performing the steps of:
       determining an activation count that indicates how many times said one or more sub-triggers of said super-trigger have been activated;
       based on said activation count exceeding a threshold value, determining whether said condition is satisfied; and
       in response to determining that said condition is satisfied, performing said action;
       wherein said threshold value is defined using a key word defined in multidimensional expression syntax.

12. The computer-readable storage medium of claim 11 wherein said metadata establishes a plurality of triggers as sub-triggers of said super-trigger.

13. The computer-readable storage medium of claim 11, wherein:
   the super-trigger is a first super-trigger;
   the computer-readable storage medium further comprising instructions for:
      creating a second super-trigger by storing metadata that (a) establishes one or more triggers as one or more sub-triggers of said second super-trigger, (b) specifies a condition, and (c) specifies an action;
      when said second super-trigger is activated, performing the steps of;
      determining an activation count that indicates how many times said one or more sub-triggers of said second super-trigger have been activated;
      based on said activation count, determining whether said condition is satisfied; and
      in response to determining that said condition is satisfied, performing said action;
   the second super-trigger is a sub-trigger of the first super-trigger.

14. The computer-readable storage medium of claim 11, wherein:
   said condition is one of a plurality of conditions specified for said super-trigger in said metadata; and
   said plurality of conditions is defined using case-then-else constructs.

15. The computer-readable storage medium of claim 11, wherein determining an activation count includes retrieving information from a log.

16. The computer-readable storage medium of claim 11, wherein determining whether said condition is satisfied includes evaluating a threshold value based on one or more of said one or more sub-triggers against a fixed value.

17. The computer-readable storage medium of claim 11, wherein performing said action includes sending an email.

18. The computer-readable storage medium of claim 11, wherein performing said action includes writing data corresponding to any activated sub-trigger to a file.

19. The computer-readable storage medium of claim 11, wherein the activation count is based, at least in part, on how many times a particular sub-trigger of said super-trigger was activated.

20. The computer-readable storage medium of claim 11, wherein:
   the metadata for said super-trigger specifies:
      a plurality of conditions, and
      a plurality of actions that correspond to the plurality of conditions;
   the step of determining whether said condition is satisfied, includes determining which condition of the plurality of conditions are satisfied; and
   performing said action includes performing the action that corresponds to the condition, of the plurality of conditions, that is satisfied.

* * * * *

UNITED STATES PATENT AND TRADEMARK OFFICE
CERTIFICATE OF CORRECTION

PATENT NO. : 7,818,305 B2
APPLICATION NO. : 11/868931
DATED : October 19, 2010
INVENTOR(S) : Vijayakumar Anjur Page 1 of 1

It is certified that error appears in the above-identified patent and that said Letters Patent is hereby corrected as shown below:

On the Title Page, Item (54) in "Title", and Col. 1 line 1, delete "DATABASE" and insert -- DATABASES --, therefor.

On the Title Page, Item (73) in "Assignee", line 1, delete "Solution" and insert -- Solutions --, therefor.

In column 1, line 1, delete "DATABASE" and insert -- DATABASES --, therefor.

In column 1, line 8, delete "herby" and insert -- hereby --, therefor.

In column 2, line 58, delete "disclosure," and insert -- disclosure. --, therefor.

Signed and Sealed this
Thirty-first Day of May, 2011

David J. Kappos
*Director of the United States Patent and Trademark Office*